Figure 1:
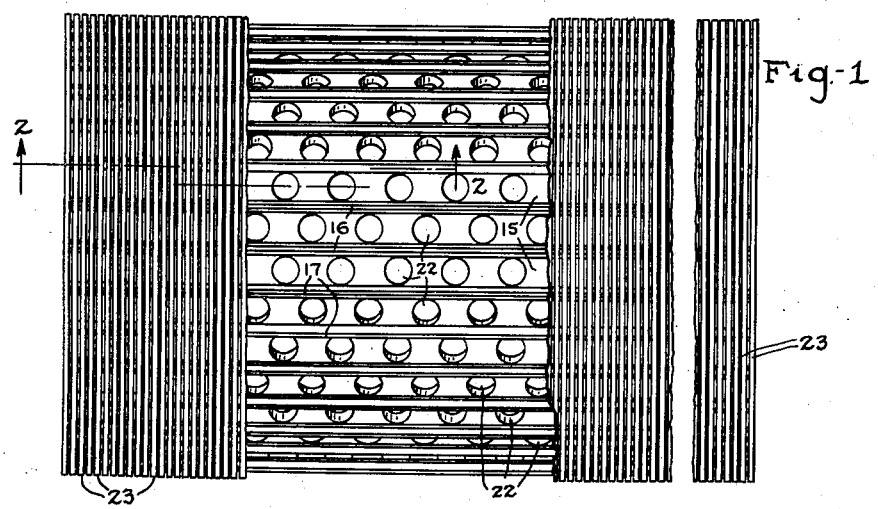

Inventor:
Edward E. Johnson.
By Whiteley and Ruckman
Attorneys.

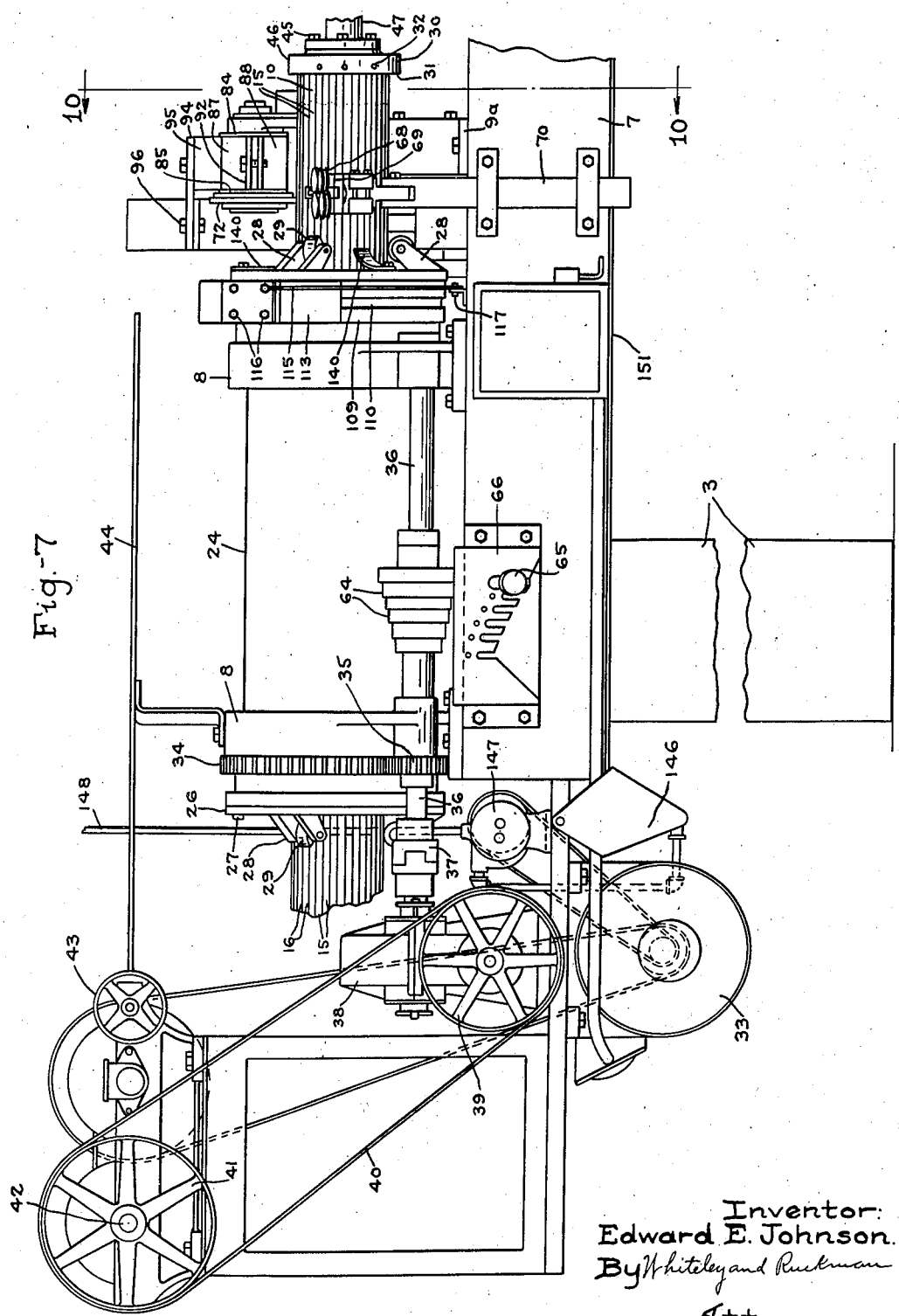

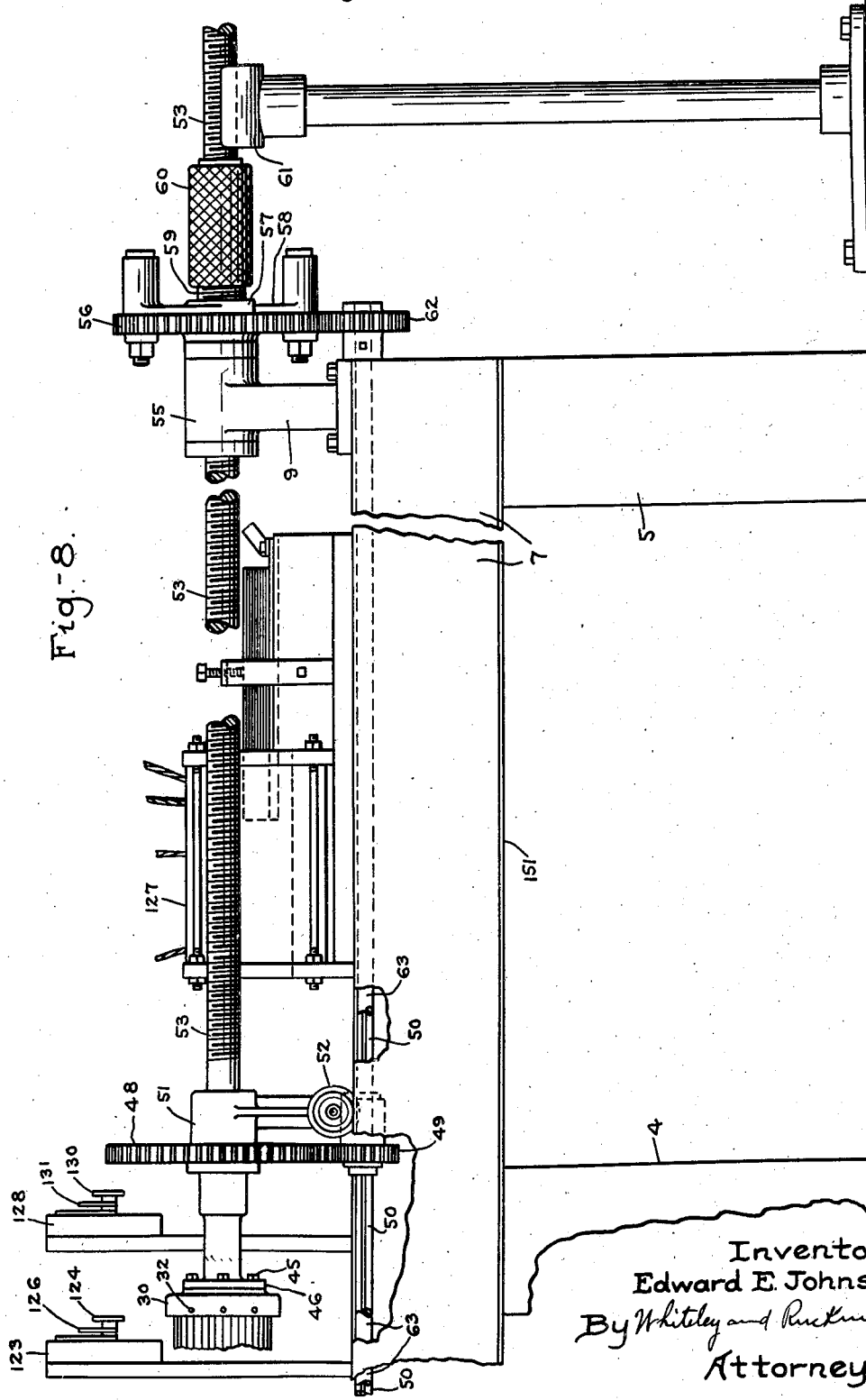

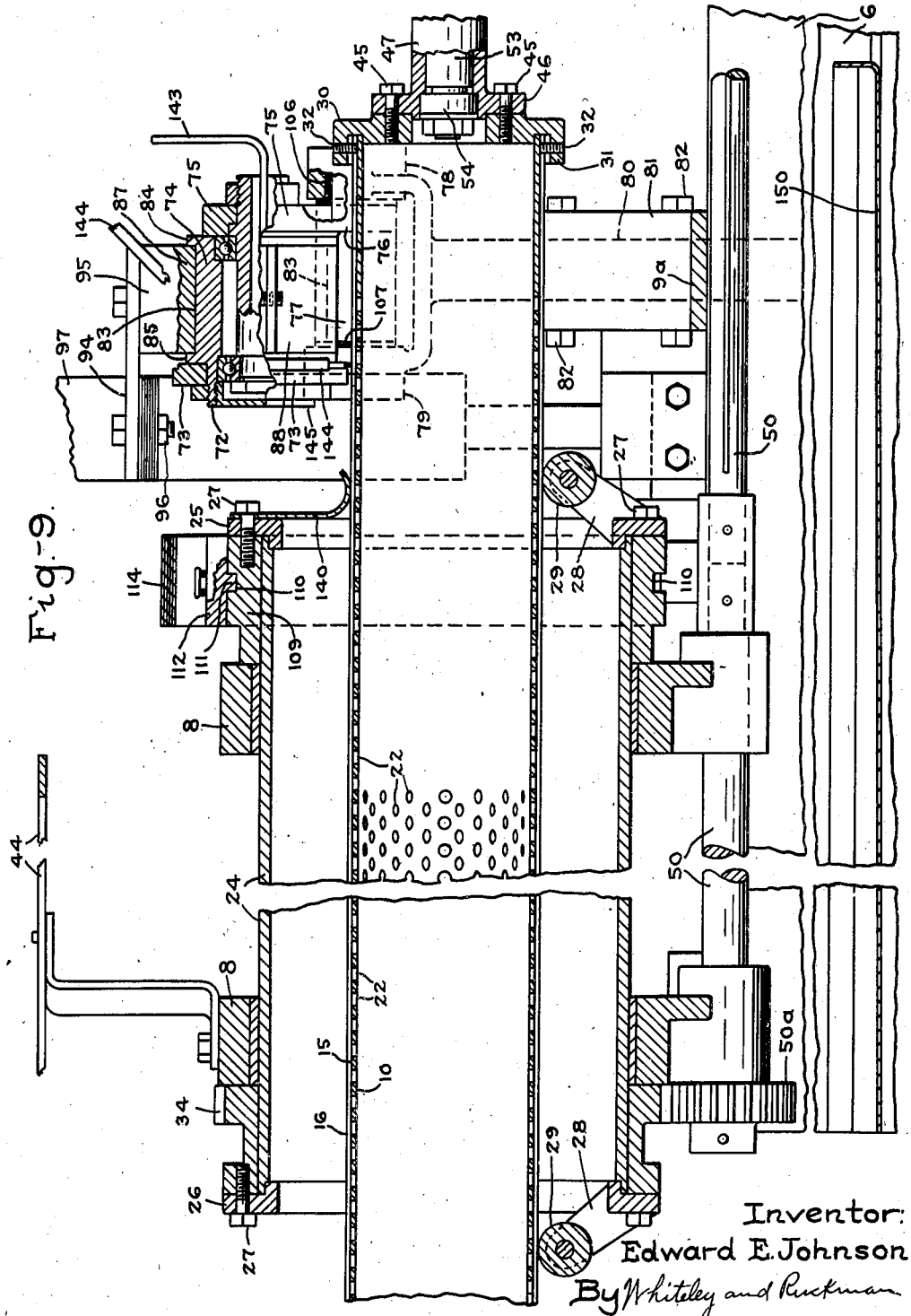

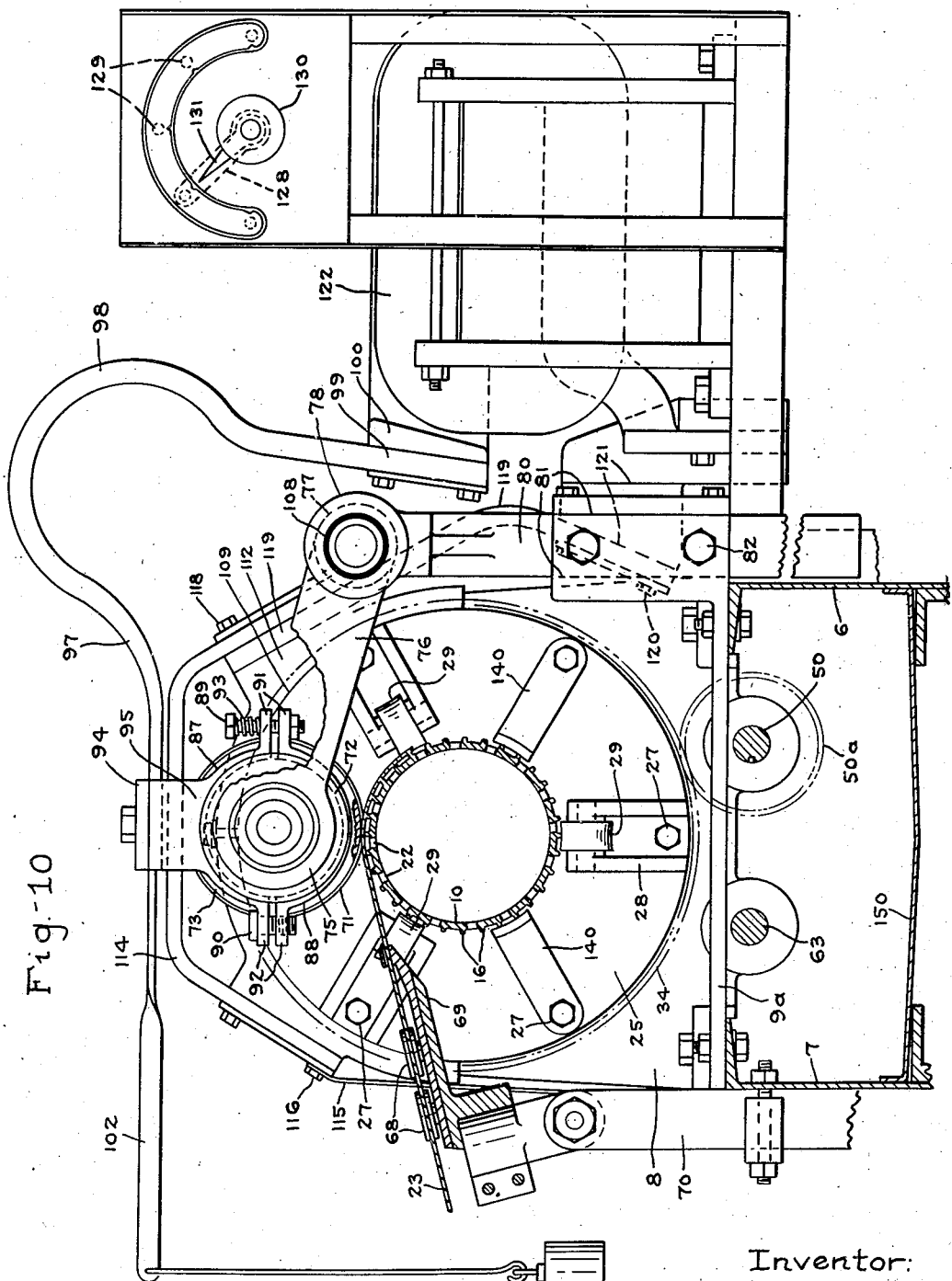

Jan. 9, 1940.  E. E. JOHNSON  2,185,999
PROCESS OF MAKING SCREENS FOR USE IN CONNECTION WITH OIL WELLS
Original Filed April 2, 1935    7 Sheets-Sheet 6
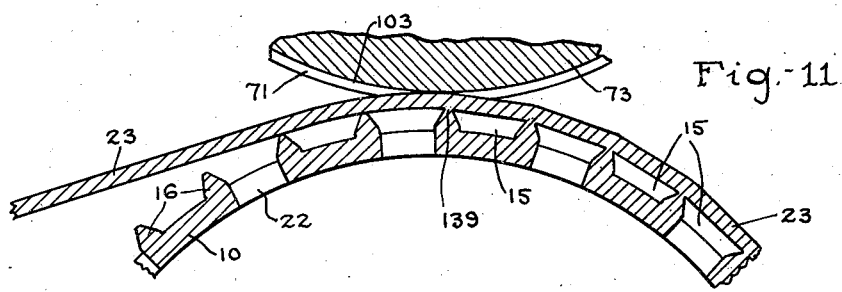
Fig.-11.
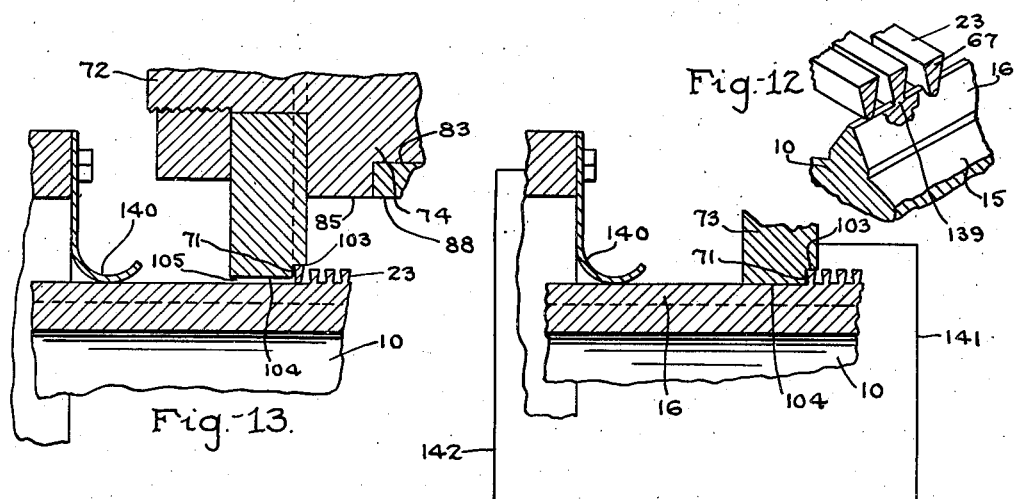
Fig.-12.
Fig.-13.
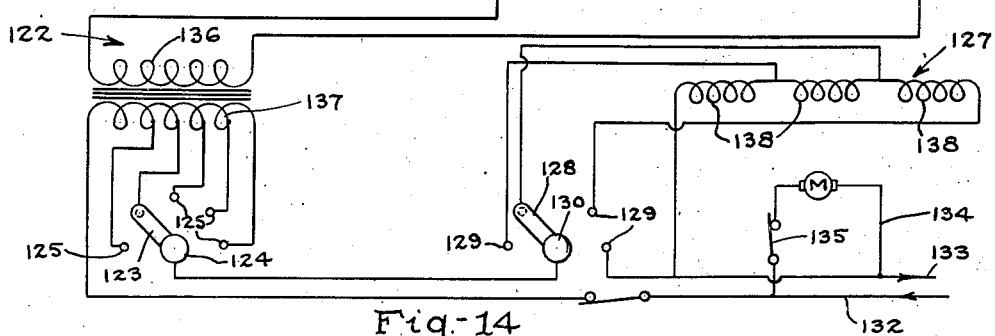
Fig.-14
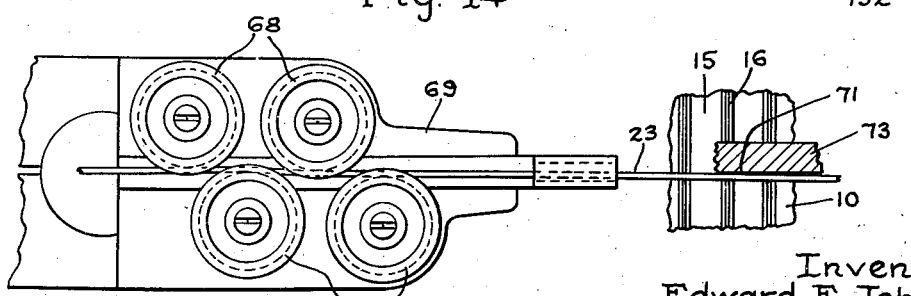
Fig.-15
Inventor:
Edward E. Johnson
By Whiteley and Ruckman
Attorneys.

Inventor:
Edward E. Johnson.
By Whiteley and Ruckman
Attorneys.

Patented Jan. 9, 1940

2,185,999

UNITED STATES PATENT OFFICE 2,185,999

PROCESS OF MAKING SCREENS FOR USE IN CONNECTION WITH OIL WELLS

Edward E. Johnson, St. Paul, Minn., assignor to Edward E. Johnson Incorporated, St. Paul, Minn.

Original application April 2, 1935, Serial No. 14,233, now Patent No. 2,046,459, dated July 7, 1936. Divided and this application December 28, 1935, Serial No. 56,493

1 Claim. (Cl. 29—163,5)

My invention relates to a process of making screens for use in connection with oil wells, and has for its object to provide means for making such a screen which is not only particularly strong and able to resist intense strains in the sinking of such a screen in very deep oil wells, but which will have a very large screening capacity, and will be substantially self-cleaning, and hence which can not clog or have it screening capacity seriously diminished.

It is a particular object of my invention to provide a process of fabricating an oil well screen of the above mentioned type and characteristics which consists of the following steps: to provide a metal tube, of steel, iron, or alloys of other metals, as may be desired, and which will have a wall-thickness greater than that necessary for the requisite strength of tube if it remained unchanged or merely perforated; to true the surface of such tube so as to make it substantially a cylinder; to form on the outside of said tube a multiplicity of flat-bottomed valleys of a desired depth separated by ribs of and integral with the metal of the tube, and which ribs will have outwardly converging walls nearly meeting at their apices, which will lie in the surface of said cylinder, the ribs thus being roughly V-shaped in cross-section; to provide a wire of V-shaped cross-section and wind that wire relically upon the ribs of the tube with its reduced edge contacting said ribs, substantially in the cylindrical plane outlined by the edges of the ribs, and with the adjacent edges of the wire everywhere uniformly spaced the same distance apart; finally, by the use of suitable welding electric current to cause the contacting metal of the wire and the ribs to melt and fuse together, and to cause the wire and ribs to be sunk together uniform predetermined distances, and be welded and integrated at each crossing point thereof.

The full objects and advantages of my invention will appear in connection with the detailed description thereof now given, and the novel features of the invention are particularly pointed out in the appended claims.

This application is a divisional of my application, Serial Number 14,233, filed April 2, 1935, Patent No. 2,046,459.

In the drawings illustrating a form of apparatus for effecting the steps of the process by which the oil-well screen is fabricated, and showing the oil-well screen so made—

Figure 2:
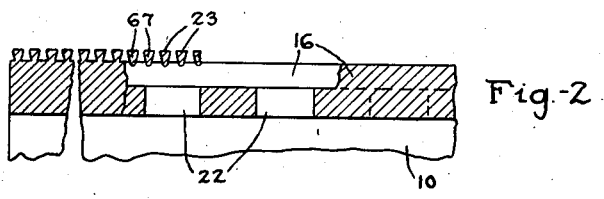
Figure 6:
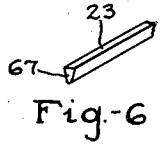
Figure 3:
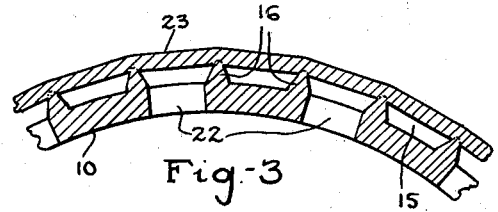
Figure 4:
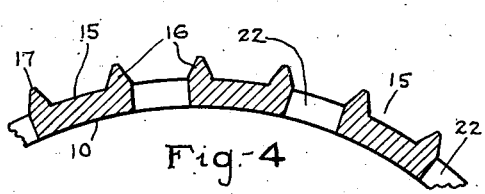
Figure 5:
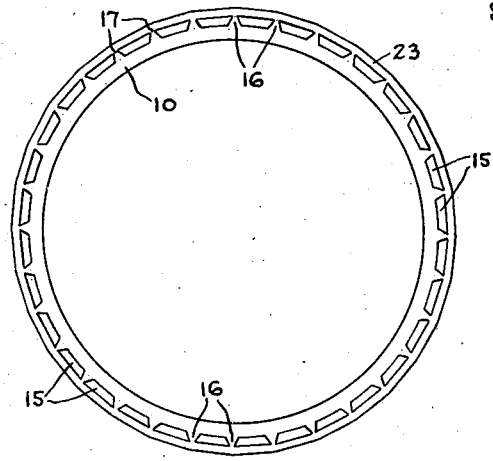
Figure 16:
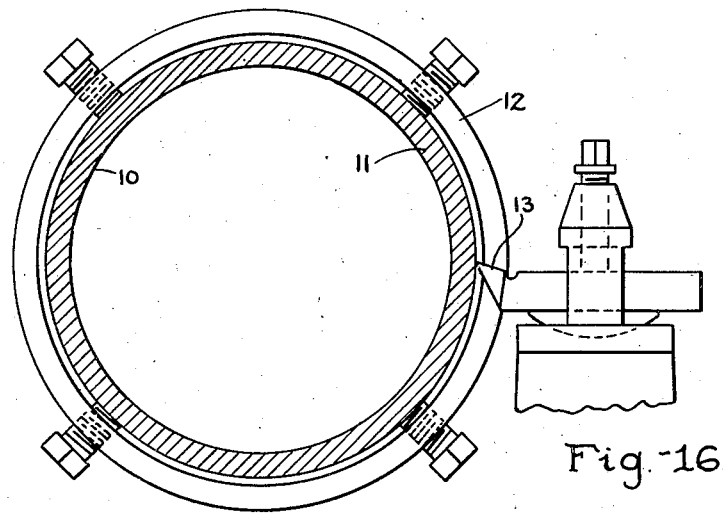
Figure 17:
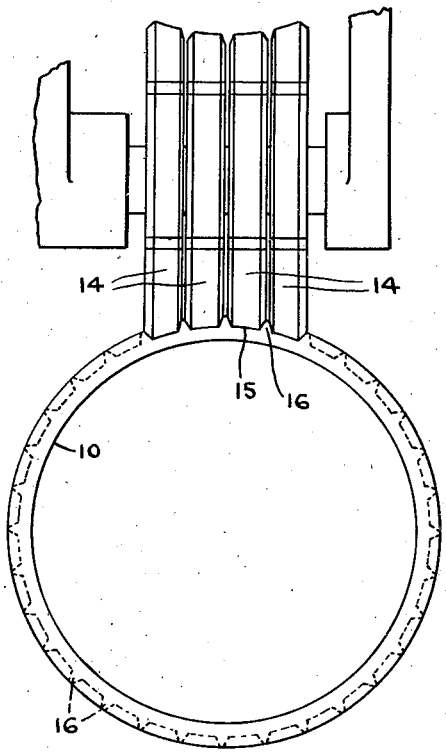
Figure 18:
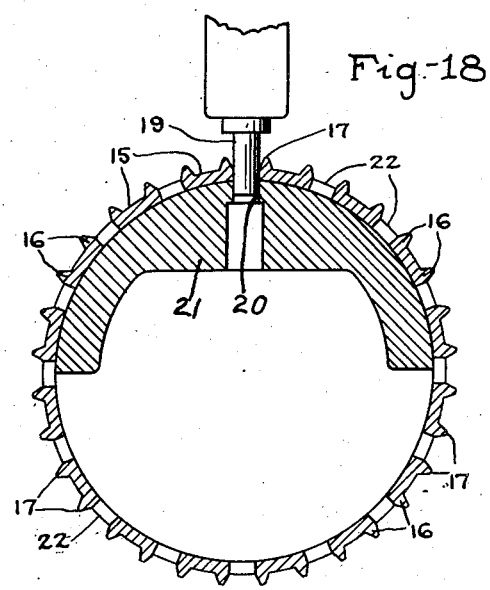

Fig. 1 is a plan view of an oil-well screen with some parts broken away illustrating the various features of the oil-well screen above defined. Fig. 2 is a partial enlarged section of a portion of the oil-well screen taken through an arc of one of the coils of the helical wire, taken on line 2—2 of Fig. 1. Fig. 3 is a transverse sectional view of a small portion of the screen taken through one of the helical coils of surface wire. Fig. 4 is an enlarged section similar to Fig. 3 showing a sectional view of ridges and valleys before the coils of wire have been laid therein. Fig. 5 is an end view of the completed oil-well screen. Fig. 6 is a perspective view of a portion of the wire used for helical wrapping. Fig. 7 is a side elevation view of part of a machine for effecting the winding and welding of the helical wire. Fig. 8 is a side elevation view of the remaining portion of said machine with some parts broken away. Fig. 9 is a longitudinal elevation of the head end of the machine showing the means of holding and guiding the tube. Fig. 10 is a side elevation partly in section showing means of holding and guiding the wire, of holding and guiding the tube, and of applying welding current to the wire. Fig. 11 is an enlarged sectional view in the welding plane through a portion of the tube and across its ribs and through a portion of the helical winding wire. Fig. 12 illustrates the manner in which the diminished edges of the wire and ribs are sunk together and integrated in the welding operation. Fig. 13 is an enlarged longitudinal section through the tube and a rib thereof and across the welding disc showing the means for limiting the movement of sinking together of wire and ribs. Fig. 14 is a similar view showing the same parts after the welding and merging operation is complete and in combination with a wiring diagram of the means for supplying and for controlling the welding current. Fig. 15 is a plan view of the means for holding and guiding the wire across the ribs of the tube and against a wall of the welding disc. Fig. 16 is a sectional part-diagrammatic view of the means for truing the surface of the tube to make it cylindrical. Fig. 17 is a sectional part-diagrammatic view of the means for milling or cutting the flat-bottomed valleys along the outside of the tube. Fig. 18 is a similar part-diagrammatic view showing means for punching the holes along the bottoms of the valleys.

Referring to Figs. 16, 17 and 18, a suitable formed tube 10, of a desired metal such as steel, is provided with an initial thickness indicated at 11 in Fig. 16 which will be enough thicker than that required for the final strength of the oil-well screen to allow for the operations hereinafter referred to. The first of these operations is indicated diagrammatically in Fig. 16, wherein the pipe 10 is shown held by a clamping ring 12 and rotated and advanced by well-known mechanism, not shown, so that the cutting tool 13, also of well-known construction and held by well-known means, will true off unevenness from the surface of the tube 10 to bring said outside surface to substantially that of a true cylinder. Such turing is necessary to make possible the welding and integrating operation hereinafter described.

After the truing above referred to the tube 10 is subjected to a milling operation such as shown diagrammatically in Fig. 17, wherein a gang of milling cutters 14 operated by well-known mechanism, not shown, will form successively a multiplicity of longitudinal flat-bottomed valleys 15 separated by intervening ridges 16 about the entire circumference of the tube, as best shown in Figs. 5 and 18. The ridges or ribs 16 are V-shaped in cross-section having outwardly converging side walls to bring said walls to almost meeting position in the surface of the trued cylinder, as indicated at 17. The ridges 16 are thus an integral part of the tube 10, being formed of the metal of the original tube, and constitute longitudinally strengthening and spacing elements for a purpose hereinafter pointed out.

The next step in the preparation of the oil-well screen tube is to provide a suitable series of holes or apertures through the walls of the tube along the bottoms of the valleys in and between adjacent pairs of ribs 16. This may be done by successively drilling the holes or by standard punching means, such as shown diagrammatically in Fig. 18, in which a punch 19 is caused by well-known operating mechanism to force successive bodies of metal from the bottoms of the valleys 16 through a die-opening 20 in a supporting anvil 21. The resulting structure is well shown in Fig. 1, wherein rows of holes 22 so formed are shown along the bottoms of the several valleys 15 and between adjacent pairs of ribs 16. It is to be noted that the holes 22 of adjacent rows are staggered with relation to the holes on either side thereof, and preferably are of a diameter equal to the width of the bottom of the valleys 15 and spaced apart a distance substantially equal to the same diameter. This arrangement makes a very strong structure, in which the intervening ribs 16 furnish powerful longitudinal strengthening elements, which, as will hereinafter be pointed out, aid further in enormously strengthening the entire oil-well screen structure by reason of the integral uniting therewith of the helical coils of the wrapping wire 23 in the manner hereinafter described.

The instrumentalities for winding the wire 23 helically upon the ribs 16 so formed with their apices outlining the surface of a cylinder will now be described. The means for supporting these instrumentalities comprise columns 3, 4 and 5 shown in Figs. 7 and 8 and extending to any suitable floor foundation. These will be composed of concrete, steel or any suitable material. Upon these supporting columns are arranged two longitudinal main beams 6 and 7, as shown in Fig. 10. These beams are held in fixed parallel and spaced relation by headstock frame members 8 which may be suitable castings, and further by tailstock frame casting 9, and by suitable transverse plates 9a. This supporting bed will be of a length such as to permit the manufacture of the longest oil-well screens, or section thereof, required. To that end the headstock and tailstock are separated a distance somewhat greater than the maximum length of oil-well screen or section thereof which it is desirable to make.

Referring to Figs. 7, 9 and 10, the hollow cylindrical spindle 24 is provided with end plates 25 and 26 secured to the spindle by means of bolts 27. Some of these bolts, as shown in Fig. 10 are in line with bracket holders 28 in which are mounted rollers 29 adapted to engage the outer surface or the ribs 16 of the tube 10 prepared as heretofore outlined. These rollers 29 are shown as three in number and will hold the tube 10 centered in respect to a head plate 30 and within an annular horizontally extended flange 31 to which the tube 10 is rigidly secured by an annular row of setscrews 32. There will in practice be three equally-spaced bracket holders 28 and rollers 29 at each end of the spindle 24, which will give the tube 10 a three-point suspension within the spindle, thereby permitting it to rotate with the spindle and at the same time be advanced longitudinally thereof along the rollers, as hereinafter described.

The spindle 24 is held to rotate on bearings formed upon and carried by the headstock castings 8, as clearly shown in Figs. 7 and 9. A ring gear 34 fast on the spindle 24 is driven by a spur gear 35 (Fig. 7) on a shaft 36 which is connected by a jaw coupling 37 with standard reduction gearing in box 38. The gearing in box 38 is driven by a pulley 39 through belt 40 from pulley 41 fast on the shaft 42. This shaft is driven from an electric motor shown at 3 through intermediate change speed gearing of well-known construction, not shown in detail, but being controlled by hand wheel 43. A hand lever 44 controls the clutch, of standard type not shown, for connecting the mechanism for operation and otherwise.

As shown in Fig. 9, the head plate 30 is secured by means of bolts 45 to a hub 46 integral with a sleeve 47. This sleeve 47, Fig. 8, has fast thereon a spur gear 48 driven by a pinion 49 splined to a shaft 50 journaled in bearings in the headstock and tailstock respectively and extending along the frame members 6 and 7. Shaft 50, Fig. 9, is driven by a pinion 50a meshing with the ring gear 34. This pinion, spur gear 48 and pinion 49 are of such size relative to the ring gear 34 and pinion 35 as to rotate the head 30 at the same speed of rotation as that of the spindle 34. The sleeve 47 and spur gear 48 are mounted upon a carriage 51 adapted to travel on rollers 52 movable along ways on the top of beams 6 and 7, and the pinion 49 is held to travel longitudinally with the carriage 51 and the spur gear 48 along shaft 50 to which it is splined for full longitudinal movement.

The longitudinal movement is effected for the purpose of causing the wire 23 to be helically wound upon the ribs 16, as will hereinafter be described. This movement is effected by a lead screw 53 which has a thrust bearing 54, Fig. 9, in the sleeve 47 about which said sleeve is free to rotate. The lead screw 53 extends through a bracket member 55 on tailstock 9 and through a spur gear 56 journaled to rotate on said bracket. This spur gear carries a pair of arms 57, 58 each of which carries half of a split nut 59 which is internally threaded to engage the threads of lead screw 53 and which has its internal threads held in operative position by a knurled hand nut 60 adapted to be withdrawn and supported on stand 61 when the construction is not set for operating the lead screw to advance the carriage 51 and the head 30. Gear 56 meshes with and is driven by a pinion 62 on a shaft 63 which extends along the frame from its rear beyond the bracket 55 to a point toward the front of the machine. As shown somewhat diagrammatically in Fig. 7, a nest of gears 64 fast on shaft 36 are adapted to cooperate with change speed gearing of usual construction having splined connection, not shown, with shaft 63, and being held in any selected position by means of control plunger 65 engaging slots in a keeper plate 66. By these means the shaft 63, pinion 62 and spur gear 56 carrying the split nut 59 are driven at a desired selected speed. This advances the lead screw 53 faster or slower as may be desired. This will result in laying the coils of the helically-wound wire 23, as now will be described, so the adjacent edges of these coils are spaced nearer or farther apart to make the drainage slots narrower or wider as may be desired.

The wire 23, which is helically wound upon the ribs 16 of the tube, has a cross-section such as indicated at 67 in Figs. 2 and 6 and 12. This comprises a flat top and converging side walls preferably ending in a curved inner portion or edge. The wire 23 is held and guided by means of guide rollers 68, Figs. 10 and 15, on a platform 66 supported for pivotal adjustment on an adjustable vertical stand 70. As so guided and held the flat-topped surface of the wire 23 will be maintained at all times in planes parallel to the axis of rotation of the spindle 24, head 30, and tube 10, and of the cylinder outlined by the edges of the ribs 16. The convexly curved reduced edge of the wire falls directly in the welding plane which extends vertically across said ribs. As shown in detail in Fig. 11, this wire will be guided and held so that it will contact not only the diminished edge of a rib 16 at the point of welding, but at all times will also contact one or more of said ribs in advance of the one where welding has taken place. The wire 23 is also held so an edge thereof will at all times engage a vertical annular surface 71 of the welding disc 73 of electrode 72 shown in Fig. 10 and in enlarged section in Fig. 11. This electrode comprises the disc 73 held on a cylindrical carrier 74, Figs. 9 and 13. The carrier rotates on an internal bearing extending from the end portion 75 of an arm 76 mounted for oscillating movement on a long bearing 77 extending between arms 78, 79 of a fork on a standard 80, the last three elements being shown in dotted lines in Fig. 9. This standard is held in a guide 81 for vertical adjustment by means of bolts 82. The carrier 74 is provided with a cylindrical surface 83, Fig. 13, forming a contact drum between flanges 84 and 85 on the carrier 74. This contact surface is turned perfectly smooth and is engaged by the split halves 87, 88 of a cylindrical contact shoe or brush. The halves are held in yielding engagement with the drum surface 83 by means of adjusting screws 89, 90, Fig. 10, engaging flange ears 91 and 92, and held in yielding engagement by means of a compression spring 93 on screw bolt 89. As shown in Fig. 10 the shoe members 87, 88 are held from turning by means of a horizontal bar member 94 secured to a frame support and bolted to an extension 95 of shoe member 87. This bar 94 is also bolted, as clearly indicated in Fig. 9, at 96 to an assemblage of a multiplicity of metallic spring-leaf conductor members 97 which are positioned and curved in the manner shown in Fig. 10 at 98, and have their ends bolted at 99 to one of the terminals 100 of the core on the secondary side of transformer hereinafter to be described. As clearly shown in Figs. 10, 11 and 13, the rolling electrode disc 73 rests on the top surface of wire 23 in the welding plane normal to the axis of rotation of the spindle 24, head 30 and tube 10. Due to the weight of these parts the gravity pressure on the wire 23 will be quite considerable and under most conditions of use will be sufficient. If, however, it should be desirable to increase such pressure this may be effected by means of a suitable removable weight 101 hung on an arm 102 which, as shown in Fig. 10, is rigidly connected to the extension 95 of shoe member 87.

Referring particularly to Figs. 11 and 13, it will be noted that the welding disc 73 of the rolling electrode 72 has in addition to the annular vertical surface 71 a wire-engaging horizontal surface 103, and further, Fig. 15, that the wire 23 is so fed as to cause its advancing edge firmly to contact the annular vertical surface 71. This results in holding the wire, as successive coils are helically laid upon the cylindrical longitudinally-advancing group of ribs 16 on the tube 10, so that the rear edge of said wire will always be uniformly spaced from the forward edge of the wire coil behind it to give a continuous slot of uniform width. Having reference to Figs. 13 and 14 it will be noted that the welding disc 73 is provided with a cylindrical surface 104 which is of considerable width. Until the welding has taken place this surface 104 will be spaced from the upturned diminished edge of the rib where welding is taking place, as indicated at 105 in Fig. 13. The moment the metal softens, however, the surface 104 contacts the diminished upper edge of rib 16, as shown in Fig. 14, with a highly important result hereinafter described. The vertically-movable disc electrode 72 is completely insulated from the frame as indicated at 106 and 107 in Fig. 9 and 108 in Fig. 10. The second electrode is, of course, in each instance one of the ribs 16 forming an integral part of the tube 10, the spindle or drum 24 which rotates with the tube 10 and the parts connected therewith. These comprise an annular contact ring 109 (Fig. 9) provided with an annular contact groove 110 in which are seated semi-circular tongues 111 fast on contact shoes or brushes 112, 113 (Figs. 9 and 10). These brushes, as shown in Fig. 10, rest upon the rotating contact surface of contact member 109, and are connected together by a group of leaf copper conductors 114 bolted to the respective brushes. The brushes 112, 113 are restrained from rotation or turning with the drum-like contact member 109 by means of a link 115 which is shown bolted at 116 to the connecting conductor members 114 and secured to the frame, Fig. 7 at 117. The contact shoes or brushes 112, 113 are in turn connected at 118 to a strip conductor member 119 which is bolted at 120 to the other terminal 121 of the secondary winding 122 of the transformer. For carrying current from the tube 10 to the contact ring 109 and the brushes 112, 113 and connecting conductor strips 114, 119, I provide, as shown in Figs. 7 and 10, a multiplicity of spring fingers 140 which are adapted to engage the surface of tube 10, upon or between adjacent ribs 16, with a wiping spring pressure. These fingers are preferably secured by the bolts 27 to the flange 25 at the front end of spindle 24 and insure certain and free flow of welding current from the several contacts of the welding electrode 72 with the successive ribs 16 through wire 23.

The means of control of electric current to the above-named welding or metallic integrating instrumentalities is shown in Figs. 8, 10 and (for wiring diagram) Fig. 14. Current is supplied through a multiple switch indicated in the wiring diagram of Fig. 14 at 123 to the transformer 122. This switch is controlled by the handle 124 by which contacts may be made with selected ones of the taps 125 indicated by pointer 126. Fig. 8. Electric current is thereby passed through differing numbers of turns or coils of wire in the primary circuit of the transformer by which is effected suitable reduction of voltage and corresponding increase of amperage or volume of flow of current in the secondary. Further control of line voltage supplied to the transformer is effected by a choke 127, see wiring diagram of Fig. 14. Electric current to the choke goes through multiple switch 128, making contacts with a selected one of taps 129 and controlled by handle 130, as indicated by pointer 131.

Following the wiring diagram of Fig. 14, line current is shown as being supplied by conducting wires 132 and 133. The motor circuit is indicated at 134 and is controlled by manually-operable switch indicated diagrammatically at 135. The welding circuit includes the transformer primary windings 137, and these are selectively introduced into the circuit in greater or less number of coils by multiple switch member 123 adapted to engage any selected one of taps 125. In the primary circuit diagram is shown the choke 127 embodying a multiplicity of windings 138. More or less of these windings are selectively brought into the circuit by multiple switch 128 adapted by means of handle 130 to be caused to contact a selected one of taps 129. By these means the primary turns in circuit is determined and the line pressure of 240 volts is controlled, to give the desired welding voltage of between two and two and one-half volts in the secondary circuit and produce a correspondingly increased amperage or volume of flow.

The secondary current of the transformer will flow to the vertically-movable welding electrode 72 and thence through whatever contact is made in the welding operation to the vertically-stationary electrode closing the secondary circuit of the transformer as indicated in the wiring diagram of Fig. 14 at 141, 142. Referring to Fig. 11, it will be obvious that the current may flow through the wire 23 contacted by the disc electrode 73 backward through ribs already welded to the wire and ahead to and through all ribs making contact with the wire. Always there is one or more of such ribs being contacted in advance of the welding plane, and it follows that these ribs and the wire immediately above the points of its contact with the ribs will be preliminarily heated by this flow of current. The shortest path for flow of current will ordinarily be through the wire in the vertical plane as indicated at 139 on Fig. 11. Here there momentarily will be the greatest flow of current, with heating effect sufficient to melt the contacting edges of the rib 16 and wire 23. This takes place almost instantaneously, hence weight of the electrode and its carrier (and weight 101 if that be desirable) causes the fused rib and wire to merge together, and permits the cylindrical surface 104, Fig. 13, to drop into contact with the upper edge of rib 16, Fig. 14. Such contact not only limits physically the amount of sinking together of wire and rib, but at the same time distributes the current along that particular rib and into the body of the tube 10 away from the welding point to check further fusion and to permit cooling of the fused portion of rib and wire.

This cooling is very materially aided and the welding heat carried off by means of a constant current of water from pipes 143 and 144, Fig. 9. The pipe 143 discharges water into the interior of the carrier for electrode 72, whence it flows out at a point indicated at 145. From that point the water flows over the edge of the electrode and into the welding plane. Pipe 144 delivers the water upon the lower portion of welding disc 73 in a direction to cause it to flow continually over the point of welding so that welding always takes place in flowing water. This water gravitates to a collecting pan 150 toward the bottom of the frame, Figs. 9 and 10, from which it flows to a sump indicated at 146 on Fig. 7. From here the water is conveyed to a pump 147 and pipe 148 to a tank, not shown, from which water flows by gravity through a conveying pipe, not shown, to water delivery pipes 143 and 144.

In the manner pointed out in my copending application, Serial Number 752,384, of which this application is in some respects a continuation, the welding of the helical coils of wire 23 to ribs 16 is effected by means of a continuous current, and at an extremely rapid rate. This is accomplished because I have discovered that when the distance between ribs 16 on the tube 10 bears a certain relation to the speed of rotation of the tube and ribs, and such speed is very rapid, the intermittent welds made successively at crossing points of wire and ribs as the wire is laid upon them, may be made with unbroken current, at low voltage and large current flow, even better than with the use of a make-and-break device. There is, therefore, used by me continuous instead of intermittent current, and the tube and ribs are rotated at a righ rate of speed to cause the wire to be laid under the welding electrode at a correspondingly rapid rate. The width of the valleys 15 is such that the ribs are spaced distances apart so related to the rate of movement of the wire across the rods as to produce this rapid welding by the use of unbroken current. In this manner I am able to effect from sixteen to eighteen hundred welds per minute of a character to merge the wire 23 and rib together until the face 104 of welding disc 73 contacts wire 16, when the concentration at 139 is dissipated, the metal at the weld immediately cooled (aided by the water thrown thereon), and a succeeding welding is almost instantly effected. This process takes place at very high speed continuously about the ribs 16 integral with tube 10 as said tube while being rotated at high speed is simultaneously advanced longitudinally by lead screw 53 and its operating parts.

The construction produced by my process is generally illustrated in Figs. 2 and 3. It comprises a foundation tube structure 10 formed with a multiplicity of valleys 15 and intervening ribs 16, the floors of the valleys being provided with rows of suitably-spaced circular holes extending through the body of the tube, and a wire of narrowed cross-section wrapped in helical coils upon the integral ribs 23, and so the reduced edge of the wire contacts the outer edge of said ribs, said wire being merged into and everywhere sunk the same predetermined distance into and being welded and integrated with the metal of the ribs 23.

There are thus formed a multiplicity of longitudinal channels of substantial width and depth along the outside of the tube communicating through the numerous holes at the bottoms of each channel with the interior of the tube, and an outer screening layer integrally united with the outer edges of the ribs formed with closely-spaced uniform inwardly-expanding slots into the channels. This produces an oil-well screen of very large capacity and self-cleaning drainage slots, and at the same time one of extraordinary strength in proportion to the weight of metal used, since the longitudinal ribs metallically integrated with the helical wire wrappings more than compensates for the loss of metal in the tube through the formation of longitudinal valleys and the punching of holes.

The advantages of this construction will be apparent from the foregoing description. It will result in an oil-well screen of remarkably adequate strength, much stronger than those heretofore employed, and also will give much greater capacity than the previous oil-well screens, and freedom from clogging. The arrangement of ribs integrally united with the body of the tube and rows of holes from the bottoms of the valleys between said ribs, relatively closely spaced, and yet producing this great strength, is an especial feature of advantage for the oil-well screen embodying my invention. Such an oil-well screen is well able to resist all stresses to which it may be subjected in the process of setting, and when once it has been set in position in the oil-bearing strata it will remain useful and operative until all available supplies of oil have been removed from the strata in the regions properly draining to the oil-well screen.

I claim:

A process of making oil-well screens which consists in forming the outside of a metallic tube to make it a substantially true cylindrical surface, removing the metal of said tube longitudinally so as to form thereon a multiplicity of longitudinally extended valleys and intervening integral ribs having their outer edges lying in said cylindrical surface, forming rows of holes through the bottoms of said valleys into the interior of the tube, winding helically upon the outer edges of said ribs a wire having a reduced portion coming to substantially an edge with said edge contacting the ribs, welding the wire and ribs together at each crossing point thereof as said wire is wound, and causing said reduced portion of said wire to contact the reduced portion of the ribs at each crossing point thereof and to be sunk together during the welding action the same predetermined distances.

EDWARD E. JOHNSON.